Feb. 24, 1959 M. E. FAIN ET AL 2,874,845
FILTRATION SYSTEM
Filed June 4, 1956 5 Sheets-Sheet 1

INVENTORS
MORTON EDGAR FAIN
HARRY COPLEY, JR.
BY
ATTORNEYS

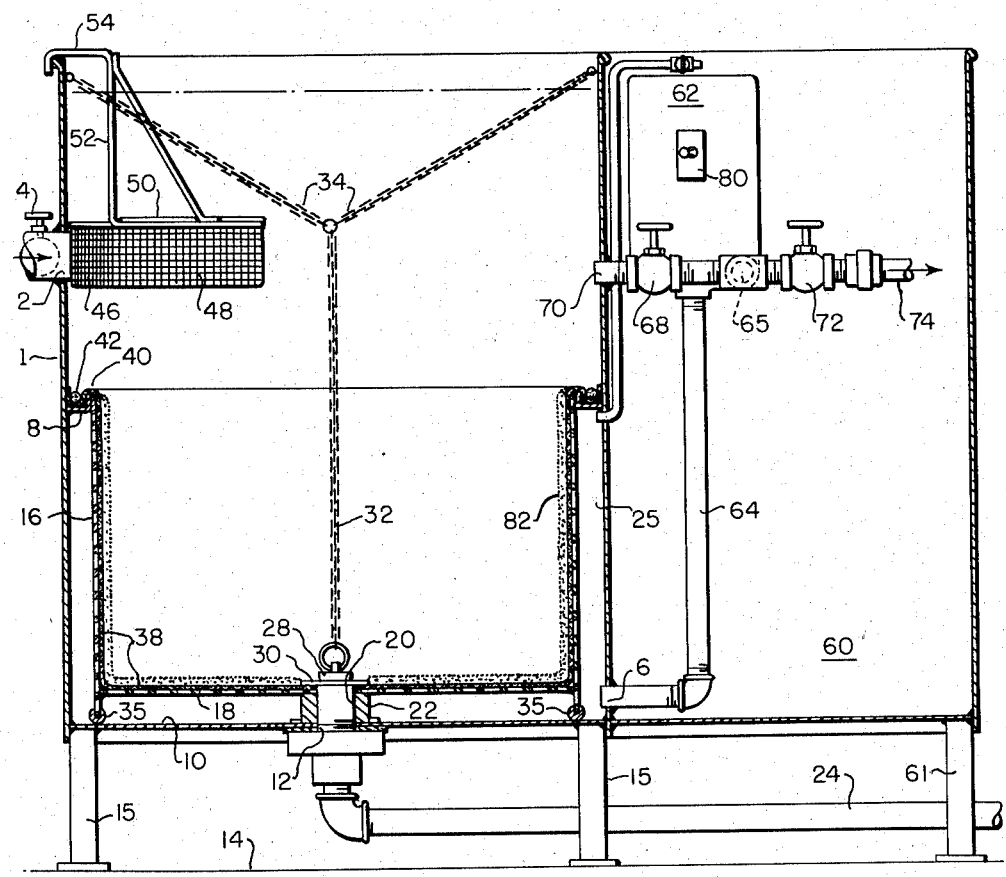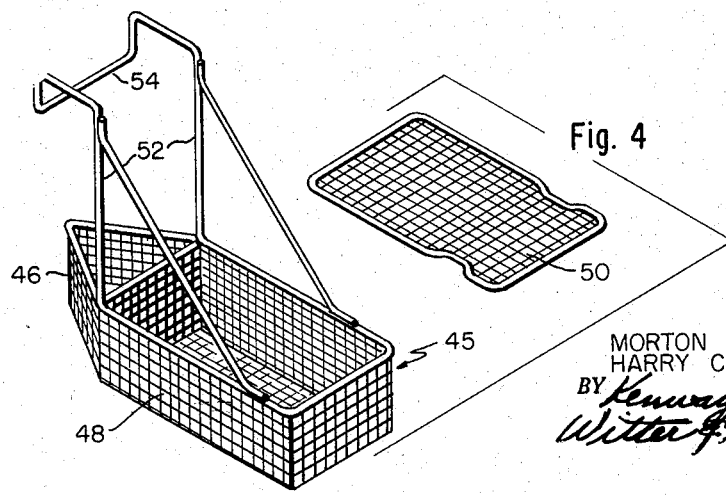

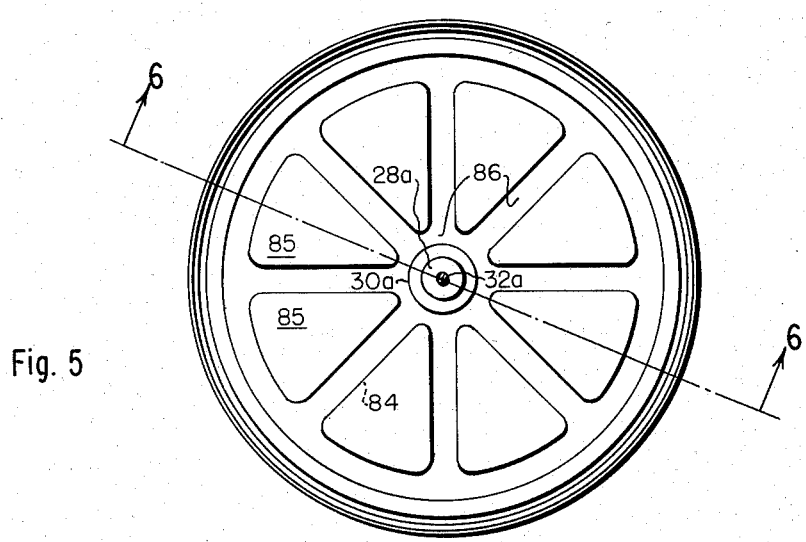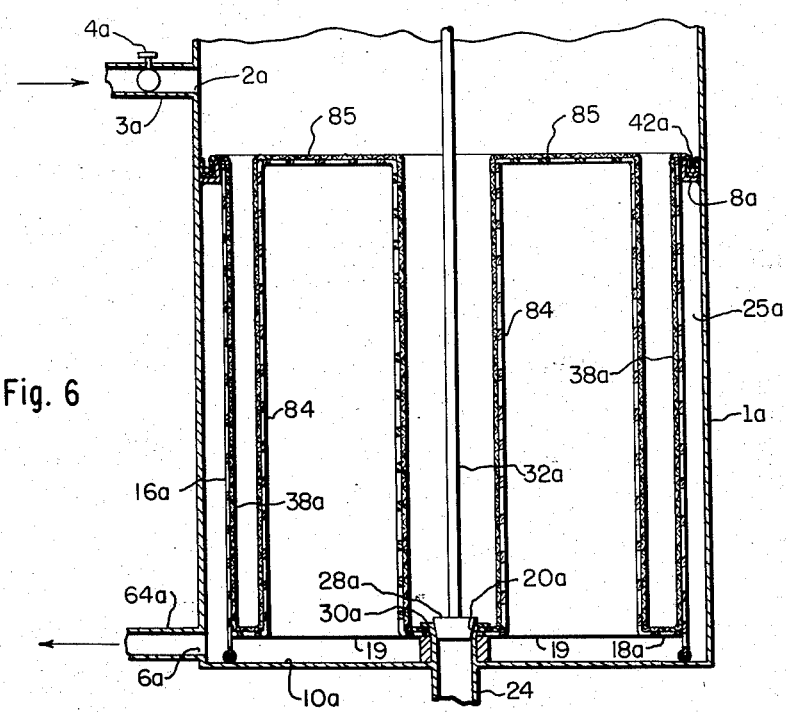

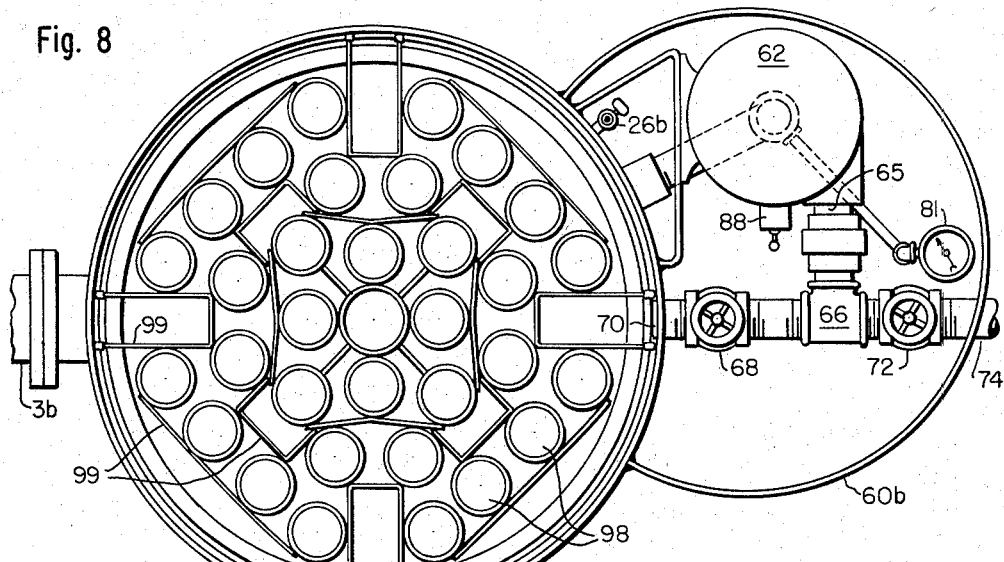
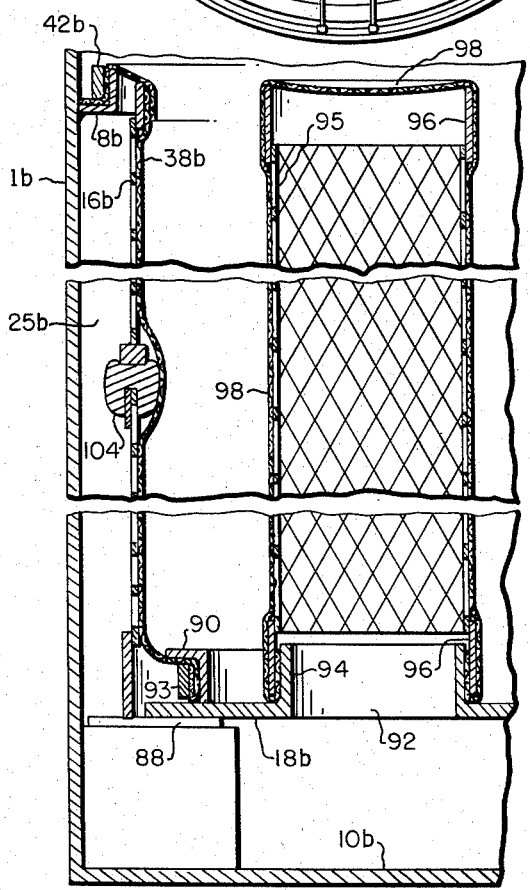
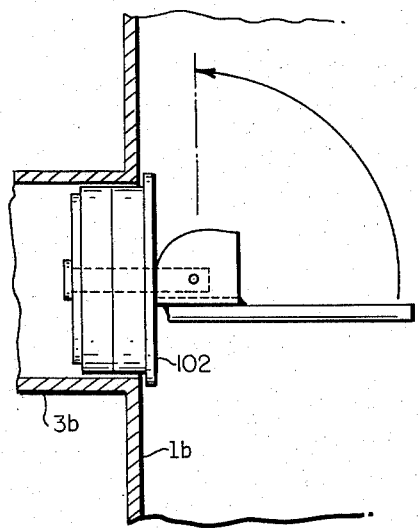

United States Patent Office 2,874,845
Patented Feb. 24, 1959

2,874,845

FILTRATION SYSTEM

Morton Edgar Fain, Providence, R. I., and Harry Copley, Jr., Fall River, Mass., assignors to Tower Iron Works Inc., Providence, R. I., a corporation of Rhode Island Application June 4, 1956, Serial No. 589,062

10 Claims. (Cl. 210—167)

This invention relates to a filtration system of the type used in swimming pools and other installations wherein it is desired to remove various types of suspended matter either continuously or periodically.

In industrial installations in general, but more particularly in swimming pools, it is highly desirable not only to remove the finely divided suspended matter so that the water will have what is known as a "polish" due to a high degree of clarity, but also to treat the water so as to eliminate microorganisms and in some cases dissolved solids. The usual practice has been to employ a battery of filter elements consisting of a pervious rigid support on which is built up a bed or coat composed of discrete particles of a suitable absorbent material, such as diatomaceous earth or other material which produces a pre-coat, a filter aid, or other filtering layer or medium. In use such filter beds gradually become clogged and in order to maintain the desired flow the water must be pumped under relatively high pressure. Ultimately the bed becomes so clogged or spent that it must be replaced with fresh material which either requires dismembering the parts, or providing specially designed apparatus for removing the spent material.

In the case of outdoor swimming pools contamination is a more serious problem and in order to maintain the desired degree of clarity the filtration system is usually continuously operated and the filter bed or coating must be replaced quite frequently. In order to cope with the problem thus presented it is the usual practice to build a relatively expensive housing adjacent to the pool in which the filtration system and adjuncts are located, and the construction and operation of such systems greatly increases the cost of installation and maintenance of an outdoor swimming pool.

The principal objects of the present invention are to provide an improved system which not only retains the advantageous features of the present systems, but also overcomes the aforementioned disadvantages, and to provide a filtration system in the form of a self-contained, relatively compact unit which may be readily installed alongside of an outdoor swimming pool or elsewhere without the necessity of providing a specially built housing.

More specific objects are to provide a filter unit which may be installed, operated and maintained at a relatively low cost and to provide a filter unit which is particularly suitable for use in vacuum or suction type systems and which permits the filter bed to be readily removed and replaced without high pressure back washing and without dismembering and reassembling the bed support and associated parts.

Further objects relate to various features of construction and will be apparent from the consideration of the following description and the accompanying drawings wherein:

Fig. 3 is an enlarged section developed on the line 3—3 of Fig. 1;

Fig. 4 is a composite perspective of the chlorination basket;

Fig. 5 is a top plan view of a filtration system of modified construction;

Fig. 6 is a section on the line 6—6 of Fig. 5;

Fig. 8 is a top plan view of the system shown in Fig. 7;

Fig. 9 is an enlarged vertical section through one of the filtering units and adjacent wall; and Fig. 10 is an enlarged section showing one form of removable plug.

Figure 1:
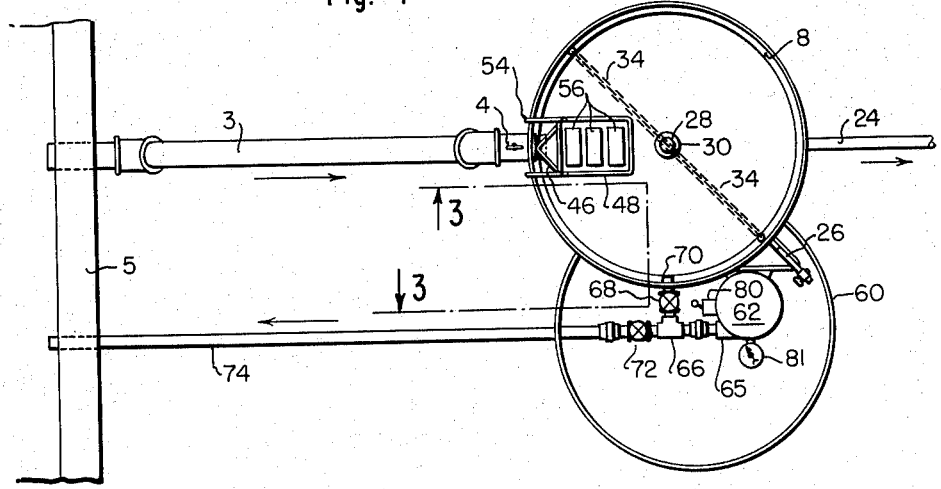
Fig. 1 is a top plan view of one embodiment of a filtration system constructed in accordance with the present invention.

In accordance with the present invention our filtration system comprises a tank which may be of metal, fiberglass reinforced plastic, wood or other suitable material, having adjacent to its upper end an inlet and adjacent to its lower end an outlet, the inlet being connected with a swimming pool or other source of liquid to be treated. Below the inlet and above the outlet of the tank is a filter support having one or more pervious wall portions such as a relatively rigid tubular perforated sheet material, expanded metal, a relatively stiff screening, a coarse woven synthetic fabric such as fiberglass coated or impregnated with an inert stiffening resin, or the like which does not materially impede the flow of a liquid and yet provides a non-collapsible support for the filter fabric.

The filter consists essentially of a flexible fibrous web such as a woven, matted or other type of fabric made from a relatively inert material such as fiberglass, nylon, Vinyon, Orlon, Saran and the like synthetic fibrous material which are strong, durable and capable of withstanding severe usage and which may be fabricated into a variety of shapes. Where the filter is made from a woven fabric the thread count is such that it is capable of retaining a filter aid such as diatomaceous earth, and if made from a felted or matted fabric its porosity should be comparable to that of a woven fabric. A typical fabric which has proved satisfactory is made from Orlon 4 x 4 ply yarn with a thread count of approximately 56 x 32 and having a Frazier air porosity rating averaging about 121 C. F. M.—it being understood that finer or coarser fabrics may be employed so long as they are capable of retaining a filter aid. Regardless of the particular type and character of the filter web, it is disposed on the pressure or upstream side of the pervious support and so arranged that all liquid running into the tank passes through the filter web and filter aid carried thereby before being discharged through the outlet.

Mounted exteriorly of the tank is a pump capable of withdrawing liquid through the outlet of the tank and either pumping it back into the tank to form a bed or precoat of filtering material on the fabric or discharging it into an exterior circuit, as for example, returning the filtered water to the swimming pool or other source. In order to permit periodic replacement of the bed, the filter support and bottom wall of the tank are provided with openings interconnected with a drain pipe which may carry a removable plug or valve.

A further feature of the invention is the provision of a simple, reliable means for treating the incoming fluid before it passes through the filter. To this end we provide a pervious container for holding a water-soluble treating compound and this container is disposed in the path of flow in the incoming liquid which dissolves or reacts with the compound. For example, a basket-like holder for compressed cakes or tablets 1″ x 3″ of calcium hypochlorite $Ca(ClO)_2$, sodium or other hypochlorite, when placed in the path of the incoming water from a swimming pool not only acts as a baffle, but the water slowly dissolves or reacts with the hypochlorite so that it is chlorinated to an extent that satisfies all sanitation laws and regulations. If desired, compressed tablets of a water treating compound may be used along with or in place of the hypochlorite, in which case the hardness-producing constituents of the water are first precipitated and then filtered out. Thus, chlorination and/or other form of water-treatment may be efficiently achieved and followed by filtration so that the water passing from the tank meets all requirements for domestic and commercial uses.

Although a pressure system may be employed, the preferred form is a gravity or suction system such as hereinafter illustrated. Referring to Figs. 1 to 4, the embodiment shown therein comprises a cylindrical tank 1 having at its upper part an inlet 2 connected by a pipe line 3, provided with a wafer valve 4, with a swimming pool 5, and at its lower end an outlet 6. The inner wall of the tank is provided with an annular flange 8 and its bottom wall 10 is provided with a central drain opening 12, the tank and parts carried thereby being supported above the floor or foundation 14 by legs 15.

Mounted on the bottom wall 10 is a relatively rigid tubular filter support made from perforate metal or other suitable material which provides a pervious side wall 16 (Fig. 3) and bottom wall 18 formed with a drain opening 20 registering with the opening 12. A nipple or the like coupling 22 connects the two openings which in turn are connected with a drain pipe 24 leading to a drainage. The side wall 16 defines an annular chamber 25 the upper end of which is connected with a vent line 26 which prevents the chamber from becoming air bound.

A plug 28 (Fig. 3) fits into an annular flange 30 which has a threaded connection with the nipple 22 and provides a closure for the drain, and this plug is connected with a chain or lifter 32 which extends to the upper part of the housing where it is connected with a cross chain 34, the ends of which are secured to the upper end of the tank.

The bottom wall 18 (Fig. 3) of the filter support is held above the level of the drain 24 and the upper edge of the side wall is maintained at the level of the flange 8 by spaced legs 35. A filter 38 in the form of a cylindrical bag fits against the inside of the side and bottom walls 16 and 18 and this filter is provided with a central opening, the marginals of which underlie the flange 30. The upper edge of the filter is provided with an extension or hem 40 which is rolled over the flange 8 and held in fixed position by a suitable clamping means 42, such as a compressible flexible tubular ring or the like.

Mounted above the filter support and in the path of flow of water following through inlet 2 is a basket-like perforate container 45 (Fig. 4) which may be formed with a convergent end 46, and a rectangular body portion 48 over which a cover member 50 fits. Supporting handles 52 are integrally connected with the body portion and are bent to provide a hook-like bail 54 adapted to hook on the upper part of the tank as shown for example in Figs. 1 and 3. The container 48 holds a plurality of compressed cakes or tablets 56 (Fig. 1) of calcium hypochlorite. If desired, the front end of the container may be provided with a removable shield or baffle 58 (Fig. 4) adapted to hook on the upper edge of the container so as to deflect a part of the water that would otherwise pass through the container.

Welded or otherwise secured to the tank 1 is a semi-cylindrical housing 60 which may be supported above the floor level by legs 61 or other appropriate means. Mounted in the upper part of the housing is a motor-driven centrifugal pump 62, the intake port of which is connected by a suction line 64 with the outlet 6 of the tank. The discharge port 65 of the pump is connected with a discharge line comprising a T 66, one branch of which is connected to a valve 68 which in turn is connected by a nipple 70 with the interior of tank 1 at a level above the filter. The other branch of the T is connected with a valve 72 which in turn is connected with a return line 74 running to the upper part of the swimming pool 5.

Figure 2:
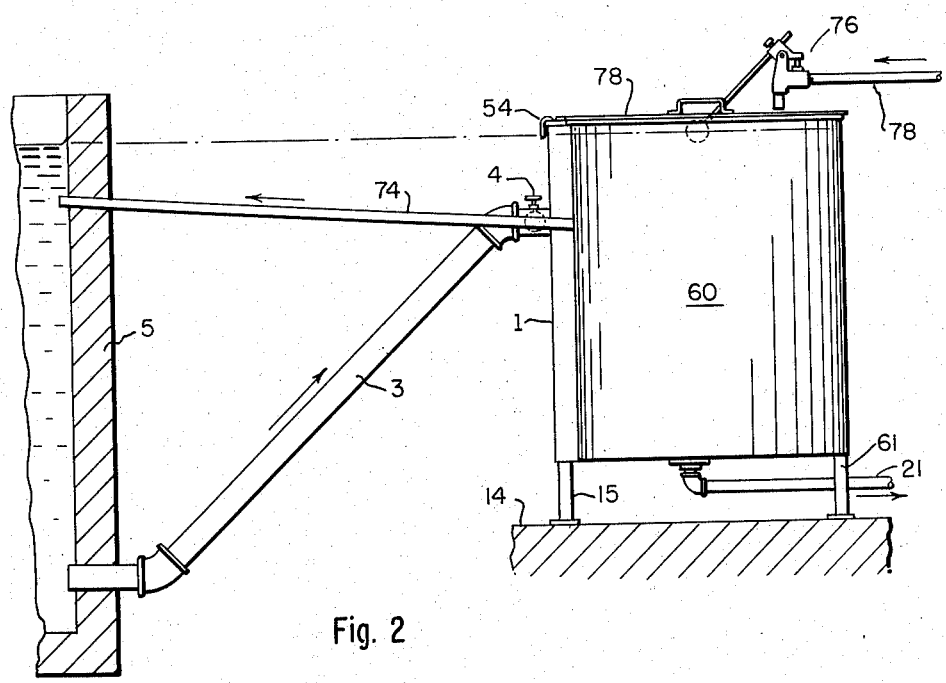
Fig. 2 is a side elevation of the system shown in Fig. 1.

Since it is desirable to maintain a high water level in the swimming pool, a float or pressure actuated valve 76 connected with a water supply line 78 (Fig. 2) may be mounted on the housing 60 so that its float extends into the tank 1, as illustrated in Fig. 2, thus automatically opening the supply line when the water in tank 1 drops below a predetermined level.

I desired, both the tank 1 and housing 60 may be provided with a suitable cover 78 and a starting switch 80 is mounted on the motor and a suction gage 81 may be connected with the intake of the pump. If desired, various other conventional controls may be provided.

The operation of our filtration system is as follows:

Assuming that the water in the swimming pool and tank are at the level indicated and that a perforate container with compressed cakes or tablets of calcium hypochlorite is suspended as shown, it is first necessary to precoat the filter and to this end the valve 72 is closed, the valve 68 opened and the pump 62 started, whereupon water is drawn from the bottom of the tank 1, through line 64, pump 62 and back through line 70 to the top of the tank. If desired, the valve 4 may be closed, but since there is little if any flow from the swimming pool, it does no harm to let this valve remain open.

Having started the circulation a predetermined quantity of diatomaceous earth or other finely divided filter aid is then sprinkled into the upper part of the tank and as the circulation continues a part of the filter aid is deposited on the filter fabric 38 and some is carried through the fabric and passes into the precoat circuit. As the filter aid is deposited on the fabric 38 it increases the resistance to the passage of water, particularly in those areas where the deposition is greater than in other areas. Hence, the flow is continuously diverted to the areas offering less resistance and consequently a uniform layer 82 is gradually built up on the fabric. The circulation of the water in the precoat circuit is continued until the water becomes clear, thus indicating complete deposition of filter aid on the filter fabric. At the start of the precoat operation air or vapor accumulating in the chamber 25 is vented through line 26, thus preventing entrapped air from interfering with the proper deposition of filter aid.

Having completed the precoat operation the valve 72 is opened and the valve 68 is closed, thus establishing a flow from the outlet of tank 1, through line 64, pump 62, valve 72, line 74, to the swimming pool 5 and then back through line 3 to the tank 1. The water flowing into the tank 1 passes through the container 48 and gradually dissolves the hypochlorite cakes 56, thus becoming chlorinated. The desired degree of chlorination may be achieved by varying the number of cakes of hypochlorite in the container 48 and when the chlorine content is up to sanitary standards the container may be removed and later replaced when more chlorine is desired. The container 46–48 also serves as a baffle which disperses the incoming stream throughout the upper part of the tank, thus preventing it from being channeled in any one path with consequent danger of eroding a particular area of the filter bed or coat.

The circulation of water to and from the swimming pool is preferably continuous so as to maintain the filter bed in position. However, sooner or later it will be necessary or advisable to replace the filter bed and to this end the valve 4 in line 3 is closed and the pump is shut off, after which the plug 28 is pulled and the spent filter cake 82 removed by spraying it off with a hose connected to the outer end of supply line 78. The spent filter aid is thus washed down the drain pipe 24 and the plug 28 may then be replaced, after which the tank 1 may be refilled by opening valve 4 and/or supply line 78 and the precoat operation, above described, is repeated.

An outstanding feature of this apparatus is the ease and speed with which the filter aid is applied, removed and replenished. As a general rule it requires but ten to fifteen minutes to apply the precoat and less than five minutes to wash the spent filter aid down the drain. Another outstanding feature is the arrangement of the inlets which permits a visual check of the washing. In event it is found desirable or necessary to supplement the precoat so as to extend the cycle of filtration, filter aid may be added directly to the upper part of the tank, and periodic replacement of the hypochlorite may be made without stopping the filtration operation. It will be noted that regardless of whether a precoat is being built up, washed off or replenished, no dismembering of the parts are necessary and furthermore a minimum amount of water is wasted in replacing the filter aid. It will also be noted that water lost by evaporation or leakage is automatically replaced by the operation of the float valve which maintains the desired level in the tank and pool.

The embodiment shown in Figs. 5 and 6 is designed to provide a greater filtering area and hence has a greater capacity for a given size tank than that of the above described embodiment. The tank 1a and associated parts, except for the filter support and fabric, is substantially the same as those of the previously described embodiment and similar reference characters are applied to corresponding parts. In this embodiment the side wall 16a of the tubular support is connected with a bottom wall 18a formed with sector shaped openings 19 that are circumferentially spaced and radially disposed with respect to the central drain opening 20a. Integrally joined to the bottom wall 18a and surrounding the openings 19 are perforate tubular members 84 of sector-shaped cross-section and fitting over the tubular members are inverted bag-shaped filters 85 of flexible fabric, the lower ends of which are joined to a spider-shaped filter fabric 86 formed with a central opening to accommodate the drain flange 30a. The outer edges of the filter fabric 86 are connected with the filter fabric 38a positioned against the inner face of the tubular support 16a.

This construction and arrangement of parts provides a continuous filter surface which extends downwardly from flange 8a along the inner surface of tubular support 16a, then along the bottom wall between the openings 19 and upwardly about the outer surfaces of the fabric 85 carried by the members 84, thus providing a greatly increased filtering area for a given size tank. The operation and inherent advantages are the same as those above set forth.

The embodiments shown in Figs. 7 to 10 is, in principle, the same as above described and the same or similar reference characters are applied to corresponding parts. In this embodiment and the modifications the tubular side wall 16b may be integral with or separable from the bottom wall 18b, but both are supported on flanges 88, pins or other suitable means at the junction of the side and bottom walls of the tank 1b. The periphery of the bottom wall 18b is provided with an annular flange 90, similar to the flange 8b, and its body portion is provided with a group of symmetrically disposed openings 92 each surrounded by an upstanding flange 94 (Fig. 9). The filter fabric 38b extends from the upper flange 8b to the lower flange 90, its upper edge being clamped in position by a tube or rope 42b and its lower edge being clamped in position by a band 93 which may be of stainless steel or other suitable material.

Figure 7:
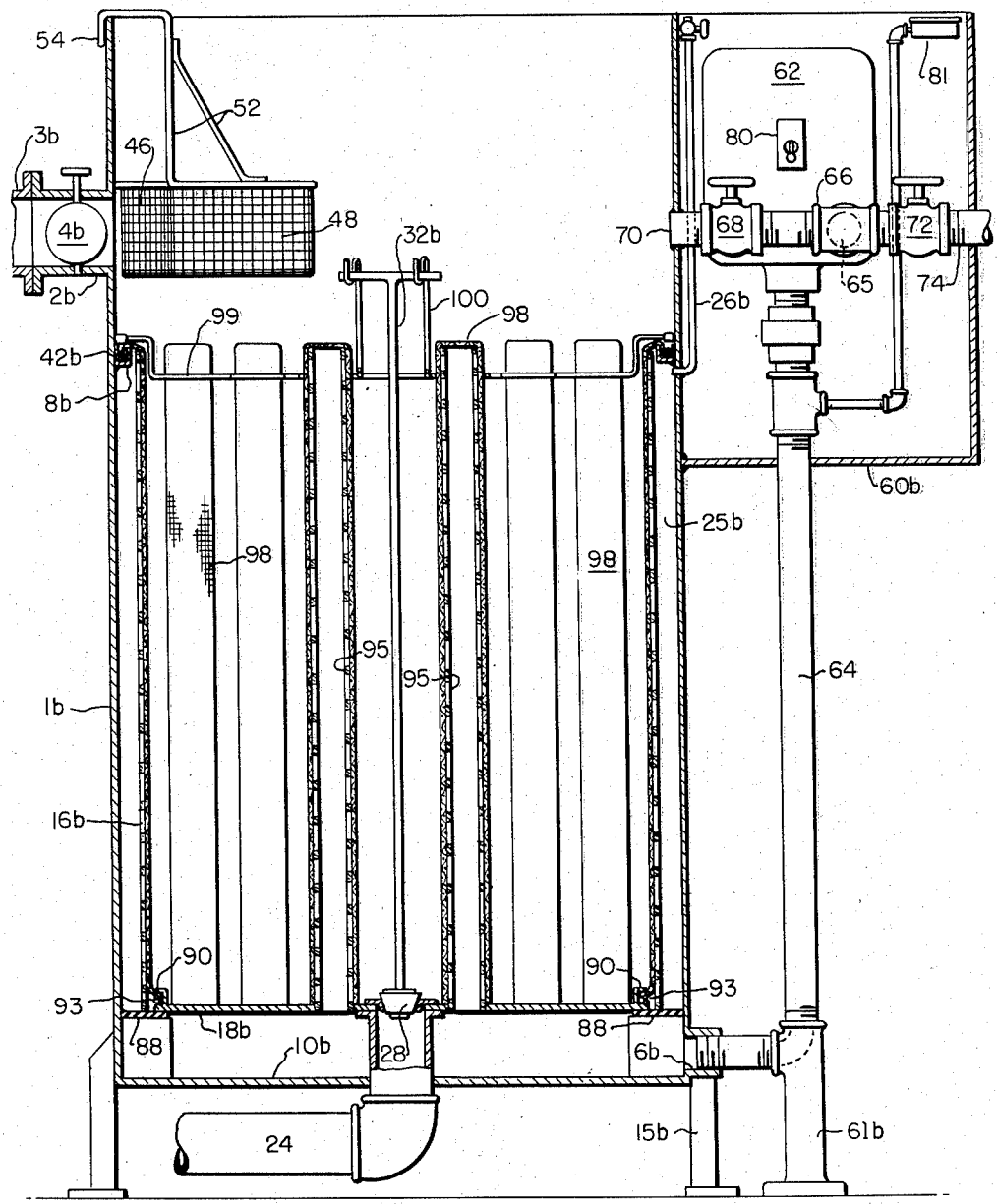
Fig. 7 is a vertical section through another embodiment of the invention.

As shown in Fig. 7, the intake or suction line 64 is connected with the outlet 6b by a T having an elongate branch 61b, the end of which is flanged to provide a foot which rests on the floor or foundation so as to support the pump 62 and associated parts, thus relieving the upper part of the tank from the strain that it would otherwise bear. The branch 61 is suitably plugged so as to confine the flow through the other two branches.

Mounted on the flanges 94 are tubular filter supports 95 made from expanded or perforated metal, or the like rigid material, the opposite end portions being open and provided with bands 96 which fit about flanges 94. Inverted bag-shaped filters 98 fit about the supports 95 and their open ends are tucked about the lower bands 96 which clamp them against the flanges 94, as shown in Fig. 9. The lower ends of the tubular supports are thus firmly anchored in position and their upper ends are held in position by a group of interconnected spacer wires 99 supported by the flange 8b. If desired, the central spacer may support a holder 100 (Fig. 7) for the lifter rod 32b, and in place of a wafer valve 4b, an expandable plug 102 (Fig. 10) may be employed to close inlet line 3b. If desired, the side wall portion 38b may be fabricated in a plurality of cylindrical sections which are interconnected by a coupling ring 104 (Fig. 9) or other suitable interlocking rings.

In addition to having all the advantageous features of the prior embodiments, the arrangement shown in Fig. 9 has the further advantage of permitting a quick replacement of the tubular members 95 with or without the filter fabric 98, it being noted that the members 95 may readily be detached from the flanges 94 and quickly replaced.

While we have shown different desirable embodiments of the invention it is to be understood that this disclosure is for the purpose of illustration and various changes and modifications, other than those above suggested, may be made without departing from the spirit and scope of the invention as set forth in the appended claims.

We claim:

1. In a liquid purification system of the type having a reservoir for holding the liquid to be purified, the reservoir having an inlet duct and an outlet duct and a circulating pump having intake and discharge ports, filtering apparatus comprising an elongate tank having on its inside wall between its opposite ends a flange, a rigid, tubular support mounted within said tank, said support having a pervious side wall spaced from the side wall of said tank with its upper edge at substantially the same level as said flange, the bottom wall of said support being spaced above that of said tank, an inlet line connected with the outlet duct of said reservoir and extending into said tank above said flange, an outlet line extending from the lower end of said tank below said support, a flexible filter web extending about the inside wall of said support with its upper edge secured to said flange, a conduit connecting the intake port of said pump with said outlet line, and a discharge line connected with the discharge port of said pump, said discharge line having two valved branches, one of which is connected to said tank above said flange and the other branch being connected with the inlet duct of said reservoir.

2. A filtration system as set forth in claim 1, wherein the bottom walls of the support and tank are provided with interconnected drain openings, a removable plug fitting the opening in the bottom wall of said support, and a lifter connected with said plug and extending upwardly above said inlet.

3. A filtration system as set forth in claim 1, wherein a vent extends from the upper part of the space between the side walls of said support and tank upwardly to a level above said inlet.

4. In a liquid purification system of the type having a reservoir for holding the liquid to be purified, the reservoir having an inlet duct and an outlet duct and a circulating pump having intake and discharge ports, filtering apparatus comprising an elongate tank having on its inside wall between its opposite ends a flange, a relatively rigid tubular support mounted with said tank, said support having a pervious side wall spaced from the side wall of said tank with its upper edge at substantially the same level as said flange, the bottom wall of said support being spaced above that of said tank, the bottom wall of said support being formed with a plurality of spaced openings, a plurality of upstanding elongate tubular foraminous members mounted on said bottom wall with their lower ends surrounding said openings, a filter comprising a flexible web extending about the inside wall of said support with its upper edge secured to said flange and a plurality of inverted bag-shaped filters disposed about the outside of said foraminous members, an inlet line connected with the outlet duct of said reservoir and extending into said tank above said flange, an outlet line extending from the lower end of said tank below said support, a conduit connected with the intake port of the pump with said outlet line, and a discharge line connected with the discharge port of said pump, said discharge line having two valved branches, one of which is connected to said tank above said flange and the other branch being connected with the inlet duct of said reservoir.

5. A filtration system as set forth in claim 4, wherein said upstanding elongate tubular foraminous members have sector-shaped cross-sections and are circumferentially spaced and radially disposed with respect to each other.

6. In a liquid purification system of the type having a reservoir for holding the liquid to be purified, the reservoir having an inlet duct and an outlet duct and a circulating pump having intake and discharge ports, filtering apparatus, comprising an elongate tank, a filter support within said tank having a bottom wall spaced from that of said tank, the bottom wall of said support having a plurality of spaced openings provided with upstanding flanges, a plurality of upstanding elongate foraminous tubular members having their lower ends fitting about said upstanding flanges, a plurality of inverted bag-shaped filters disposed about the outside of said tubular members with their open lower ends clamped between the lower ends of said tubular members and said upstanding flanges, the upper part of said tank having an inlet at a level above the top of said tubular members and connected with the outlet duct of said reservoir the lower part of said tank having an outlet below the lower ends of said tubular members, a conduit connecting the intake port of said pump with said outlet line, and a discharge line connected with the discharge port of said pump, said discharge line having two valved branches, one of which is connected to said tank above said tubular members and the other branch being connected with the inlet duct of said reservoir.

7. In a liquid purification system of the type having a reservoir for holding the liquid to be purified, the reservoir having an inlet duct and an outlet duct and a circulating pump having intake and discharge ports, filtering apparatus, comprising an elongate tank having on its inner wall adjacent to its upper end a continuous flange, a support mounted within said tank, said support having a pervious side wall with a cross-sectional shape similar to but smaller than that of said tank and a bottom wall spaced from that of said tank, the marginal portion at the lower end of said support having a continuous flange, said pervious side wall extending from one flange to the other, a flexible filter web disposed about the inner side of said foraminous side wall with its upper and lower edges fitting about said flanges, means clamping said edges about said flanges, the upper part of said tank having an inlet connected with the outlet duct of said reservoir above the upper end of said pervious wall and the lower part of said tank having an outlet below the lower end of said pervious wall, a conduit connecting the intake port of said pump with said outlet line, and a discharge line connected with the discharge port of said pump, said discharge line having two valved branches, one of which is connected to said tank above said flange and the other branch being connected with the inlet duct of said reservoir.

8. In a liquid purification system of the type having a reservoir for holding the liquid to be purified, the reservoir having an inlet duct and an outlet duct and a circulating pump having intake and discharge ports, filtering apparatus, comprising an elongated tank having on its inner wall adjacent to its upper end a continuous flange, a support mounted within said tank, said support having a pervious side wall with a cross-sectional shape similar to but smaller than that of said tank and a bottom wall spaced from that of said tank, the marginal portion at the lower end of said support having a continuous flange, said pervious side wall extending from one flange to the other, a flexible filter web disposed about the inner side of said pervious side wall with its upper and lower edges fitting about said flanges, means clamping said edges about said flanges, the bottom wall of said support having a plurality of spaced openings provided with upstanding flanges, a plurality of upstanding elongate foraminous tubular members having their lower ends fitting about said upstanding flanges, a plurality of inverted bag-shaped filters disposed about the outside of said tubular members with their open lower ends clamped between the lower ends of said tubular members and said upstanding flanges, the upper part of said tank having an inlet connected with the discharge duct of said reservoir at a level above the top of said tubular members and the lower part of said tank having an outlet below the lower ends of said tubular members, a conduit connecting the intake port of said pump with said outlet line, and a discharge line connected with the discharge port of said pump, said discharge line having two valved branches, one of which is connected to said tank above said tubular members and the other branch being connected with the inlet duct of said reservoir.

9. In a liquid purification system of the type having a reservoir for holding the liquid to be purified, the reservoir having an inlet duct and an outlet duct and a circulating pump having intake and discharge ports, filtering apparatus comprising a tank having an inlet and an outlet adjacent to its opposite end portions, said inlet being connected to the outlet duct of said reservoir, a rigid tubular support mounted within said tank, said support having a pervious side wall and a bottom wall spaced respectively from the side and bottom walls of said tank, the upper end of the side wall of said support being below the inlet and its bottom wall being above the outlet, a flexible filter web extending about the inside area of said support, a conduit connected with the lower part of said tank and the intake port of said pump, and a discharge line connected with the discharge port of said pump, said discharge line having two valved branches, one of which runs to said tank above the upper end of the pervious side wall and the other branch to the inlet duct of said reservoir.

10. In a liquid purification system of the type having a reservoir for holding the liquid to be purified, the reservoir having inlet duct and an outlet duct and a circulating pump having intake and discharge ports, filtering apparatus comprising a tank having an inlet and an outlet adjacent to its opposite end portions, said inlet being connected to the outlet duct of said reservoir, a rigid tubular support mounted within said tank, said support having a pervious side wall and a bottom wall, spaced respectively from the side and bottom walls of said tank, the upper end of the side wall of said support being below the inlet and its bottom wall being above the outlet, the bottom walls of said support and tank having openings connected by a drain line, a removable plug seated within the openings in said support, a flexible filter web extending about the inside of said support, a conduit connected with the lower part of said tank and the intake port of said pump, and a discharge line connected with the discharge port of said pump, said discharge line having two valved branches, one of which runs to said tank above the upper end of the pervious side wall and the other branch to the inlet duct of said reservoir.

References Cited in the file of this patent

UNITED STATES PATENTS

| | | |
|---|---|---|
| 355,005 | Deutsch | Dec. 28, 1886 |
| 653,684 | Long | July 17, 1900 |
| 691,706 | Long | Jan. 21, 1902 |
| 855,328 | Moyle | May 28, 1907 |
| 1,081,515 | Reinohl | Dec. 16, 1913 |
| 1,696,735 | Scoville | Dec. 25, 1928 |
| 2,000,137 | Kelley | May 7, 1935 |
| 2,435,201 | Cooperider | Feb. 3, 1948 |

FOREIGN PATENTS

| | | |
|---|---|---|
| 6,987 | Great Britain | Apr. 26, 1889 |
| 323,562 | France | Nov. 13, 1902 |